United States Patent [19]
Hallett

[11] Patent Number: 5,171,346
[45] Date of Patent: Dec. 15, 1992

[54] METHOD OF FORMING A COMPOSITE THERMAL INSULATING MATERIAL

[75] Inventor: Frederick H. Hallett, Severna Park, Md.

[73] Assignee: Aktiebolaget Electrolux, Stockholm, Sweden

[21] Appl. No.: 643,370

[22] Filed: Jan. 22, 1991

[51] Int. Cl.$^5$ .................. B29C 67/22; C03B 9/00
[52] U.S. Cl. ................... 65/21.4; 65/60.3; 264/46.5; 264/46.7; 264/46.9; 264/311
[58] Field of Search ............. 264/46.4, 46.5, 45.7, 264/311, DIG. 6, 46.7, 46.9; 65/21.4, 60.3

[56] References Cited

U.S. PATENT DOCUMENTS

| | | | |
|---|---|---|---|
| 948,541 | 2/1910 | Coleman | 264/DIG. 6 |
| 2,797,201 | 6/1957 | Veatch et al. | 264/53 |
| 2,978,339 | 4/1961 | Veatch et al. | 264/DIG. 6 |
| 3,247,158 | 4/1966 | Alford et al. | 524/425 |
| 3,316,139 | 4/1967 | Alford et al. | 264/DIG. 6 |
| 3,429,955 | 2/1969 | Johnson et al. | 264/DIG. 6 |
| 3,632,703 | 1/1972 | Sullivan et al. | 264/DIG. 6 |
| 4,013,810 | 3/1977 | Long | 264/DIG. 6 |
| 4,021,589 | 5/1977 | Copley | 264/DIG. 6 |
| 4,361,453 | 11/1982 | Gagliani et al. | 264/DIG. 6 |
| 4,952,350 | 8/1990 | Duffy | 264/45.7 |

FOREIGN PATENT DOCUMENTS 2403982  8/1975  Fed. Rep. of Germany ...... 264/311
2629171  1/1978  Fed. Rep. of Germany .

Primary Examiner—Allan R. Kuhns
Attorney, Agent, or Firm—Pearne, Gordon, McCoy & Granger

[57] ABSTRACT

A composite insulator is formed having evacuated hollow plastic enclosures arranged in a closely packed configuration with a foamed plastic resin filling the interstice between the plastic enclosures. According to a preferred aspect of the invention, hollow evacuated spheres are embedded into a matrix of polyurethane foam. The composite insulator can be formed directly within an insulating cavity of an appliance or can be formed into customized panels which can be inserted into an appliance. Also, disclosed is a method of manufacturing the composite insulator by forming a seamless continuous plastic wall on a molding chamber that has been at least partially evacuated, incorporating the resulting hollow plastic enclosure into a plastic resin which is capable of being foamed in place, introducing the composite into an enclosed cavity that is to be filled with insulation, and causing the plastic resin to foam in place.

2 Claims, 5 Drawing Sheets

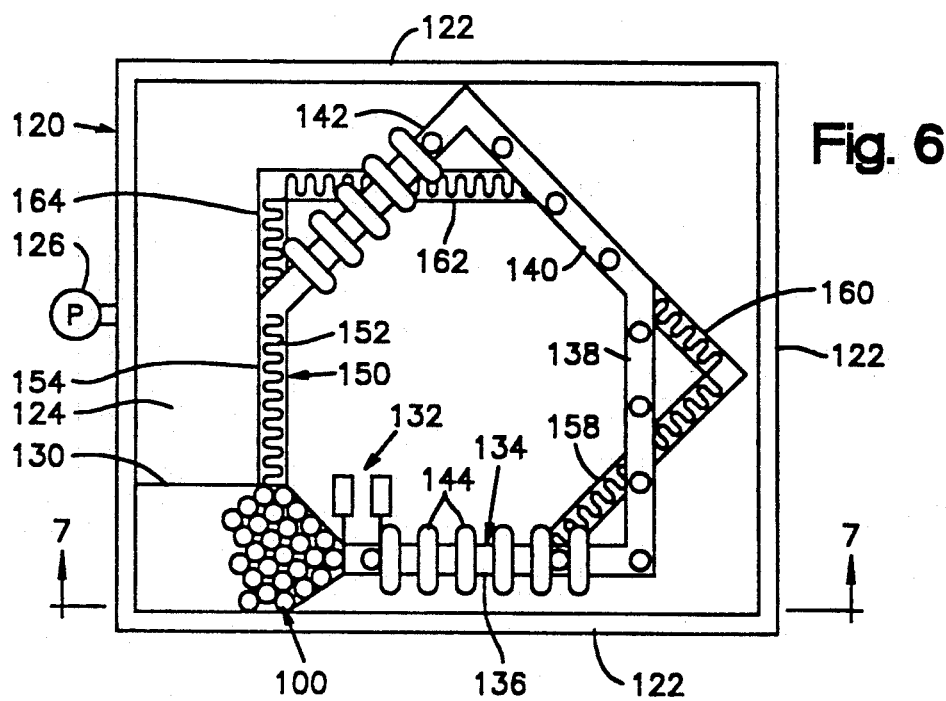
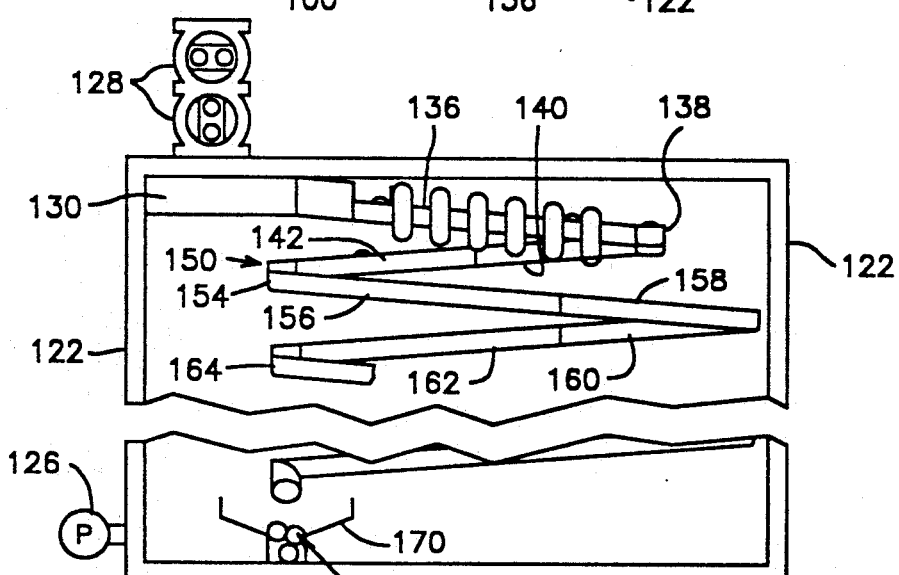
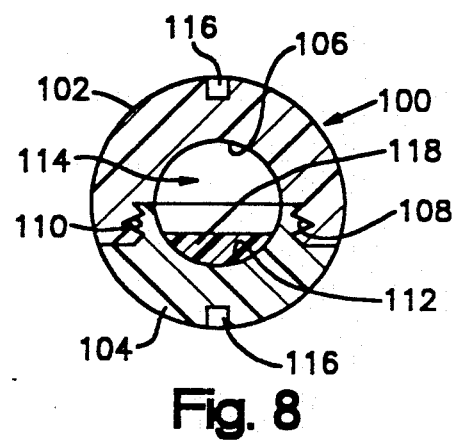

METHOD OF FORMING A COMPOSITE THERMAL INSULATING MATERIAL

TECHNICAL FIELD

This invention relates generally to a foamed-in-place composite thermal insulating material which may be poured or sprayed into hollow cavities surrounding a low temperature containment chamber such as refrigerators or freezers and, more particularly, to such thermal insulating material employing discrete evacuated enclosures disposed in an insulating foam matrix.

BACKGROUND OF THE INVENTION

Higher energy efficiency requirements for refrigerators and freezers have prompted manufacturers to investigate and develop more effective insulating materials than rigid polyurethane foam insulating materials which are currently being used. An additional motivation for finding alternatives to polyurethane foam is the growing concern over ozone depletion which will likely result in mandatory curtailment or prohibition of chlorofluoro carbons, such as CFC-11 which are commonly used as a foam blowing agent.

Improvements in foaming technology alone are not likely to result in foam insulating materials having sufficiently low thermal conductivity to preclude substantial investments in retooling to meet new energy efficiency standards. Because many currently manufactured refrigerators and freezers are near the maximum practical size that will permit passage through doorways, retooling and redesigning to meet new standards in energy efficiency with currently used insulating materials would result in reduced refrigeration capacity.

A number of alternatives are currently being explored. One method involves the use of laser-welded vacuum panels constructed from stainless steel plates. These panels have excellent insulating properties but have a number of serious disadvantages. They are heavy, expensive, not easily mass produced and conduct a significant quantity of heat at the panel ends. These panels have also had a tendency to leak at their seams whereupon their value as an insulator is practically lost.

Another alternative method of insulating refrigerators and freezers which has been investigated involves the use of an evacuated space filled with diatomaceous earth. This method suffers from many of the same disadvantages as the rigid vacuum panel, namely it would add considerable weight to refrigerators and freezers, it is much more expensive than present methods, and there have been problems with maintaining the vacuum in this type of insulating apparatus.

The use of rigid siliceous foam with vacuum bubbles has also been attempted. The difficulty with this type of insulation is that it can only be manufactured in small panels that are brittle and, consequently, are difficult to use in mass production.

It is well known that an evacuated space will serve as an effective insulator, and that decreasing absolute pressure will reduce conductive and convective heat transfer. In U.S. Pat. No. 4,027,379 issued to Cheng et al. a cryogenic vessel for holding a liquid is disclosed. The vessel is insulated by means of evacuated tubing encased in plastic foam. The patent suggests that the tubing may be made of high density polyethylene. This patent teaches that a single tube should be spirally wound around a major portion of the vessel. The tubing is closed at one end and connected to a vacuum pump at the other end to permit evacuation of the tubing to an absolute pressure of approximately one torr.

U.S. Pat. Nos. 2,969,092 and 3,007,596 described cryogenic vessels wherein the space between an inner and an outer wall is filled with insulating materials, after which the air contained therein is evacuated.

The prior art, unfortunately, fails to meet some important requirements applicable to mass production of domestic refrigerators and freezers. The most important criteria for thermal insulators used in conventional refrigerators and freezers are that they be light in weight, inexpensive, have a very low thermal conductivity, and it would be advantageous if they were adaptable to current refrigerator production techniques. When using an evacuated space as a thermal insulating barrier it is desirable to contain the vacuum within a seamless enclosure to eliminate the need for a vacuum pump as a permanent part of the insulating system and to avoid the possibility of losing the vacuum because of a small leak which could develop in a welded or fused seam.

For the foregoing reasons it is extremely desirable to develop an insulating material that employs evacuated space in a seamless, very low conductivity, light in weight, inexpensive, yet rugged form that is readily adaptable to current refrigerators and freezer production techniques.

SUMMARY OF THE INVENTION

The present invention is a two component composite thermal insulating material which can be deposited into the hollow space formed between the inner and outer walls of a low temperature containment chamber such as a refrigerator or freezer using conventional spraying methods similar to those used for forming polyurethane foam insulation. The present invention provides a hollow seamless, light-weight, corrosion-proof beads, pellets or spheres, having a structurally stable, gas-impermeable wall with the enclosed space containing a gas at a pressure substantially below normal atmospheric pressure according to a preferred aspect of this invention, this is accomplished by a rotational casting technique and in the presence of a vacuum. Plastic beads are mixed with a conventional thermal insulating foam such as polyurethane foam and sprayed into the hollow cavities formed by the inner and outer walls of a refrigerator or freezer cabinet. The beads and foam are mixed in such proportion that after the mixture is sprayed into the cabinets the beads are packed close to one another with the foam filling the interstitial space between the beads.

The beads may be formed from a low permeability thermoplastic material such as high density linear polyethylene. Polyvinylidene chloride, nylon, and ethylene vinyl alcohol are particularly desirable because of their low gas permeability characteristics.

The resulting composite structure, because of the low thermal conductivity of the evacuated space, has insulating properties superior to the thermal foam insulation alone. Because a substantial portion of the insulation volume is occupied by the hollow plastic beads, less foam insulation is required and, consequently, less foam blowing agent is required. This, in turn, may facilitate the use of less efficient substitutes in place of chlorofluoro carbon foam blowing agents.

Because the hollow beads are seamless, it is possible to take advantage of the insulating properties of a vacuum with a minimal risk of losing the vacuum because of leakage. Because the vacuum is distributed amongst a multitude of beads, leaks in a small number of individual beads will not substantially diminish the overall insulating quality of the composite and may have the desireable attribute of acting as a "scavenger" for chlorofluoro carbon foam blowing agents by drawing those agents into a ruptured evacuated bead.

According to a further aspect of this invention the beads may be formed by blowing a glass sphere having a tubular neck portion. A metered amount of a thermoplastic resin is deposited in the sphere through the neck portion and the sphere is evacuated to create at least a partial vacuum therein. The sphere may be heated while evacuated to melt the thermoplastic and drive off any volatile gasses. A narrow zone of the neck portion is heated to fuse that area and seal the sphere in a evacuated condition. The sphere is then heated to liquify the thermoplastic resin while rotating the sphere about two axes. The inside surface of the sphere is coated with the liquid thermoplastic resin and the sphere is cooled during rotation to fuse the coating. The sphere may then be dipped in a heated thermoplastic resin to coat the outside surface thereof.

BRIEF DESCRIPTION OF THE DRAWINGS

FIG. 6 is a semi-schematic plan view of an apparatus for rotationally casting molded plastic spheres according to another aspect of this invention within an evacuated enclosure;

FIG. 7 is a cross-sectional view the plane of the section being indicated by the line 7—7 in FIG. 6;

FIG. 8 is a cross-sectional view of a mold employed in the apparatus of FIGS. 6 and 7;

DETAILED DESCRIPTION OF THE INVENTION

Figure 1:
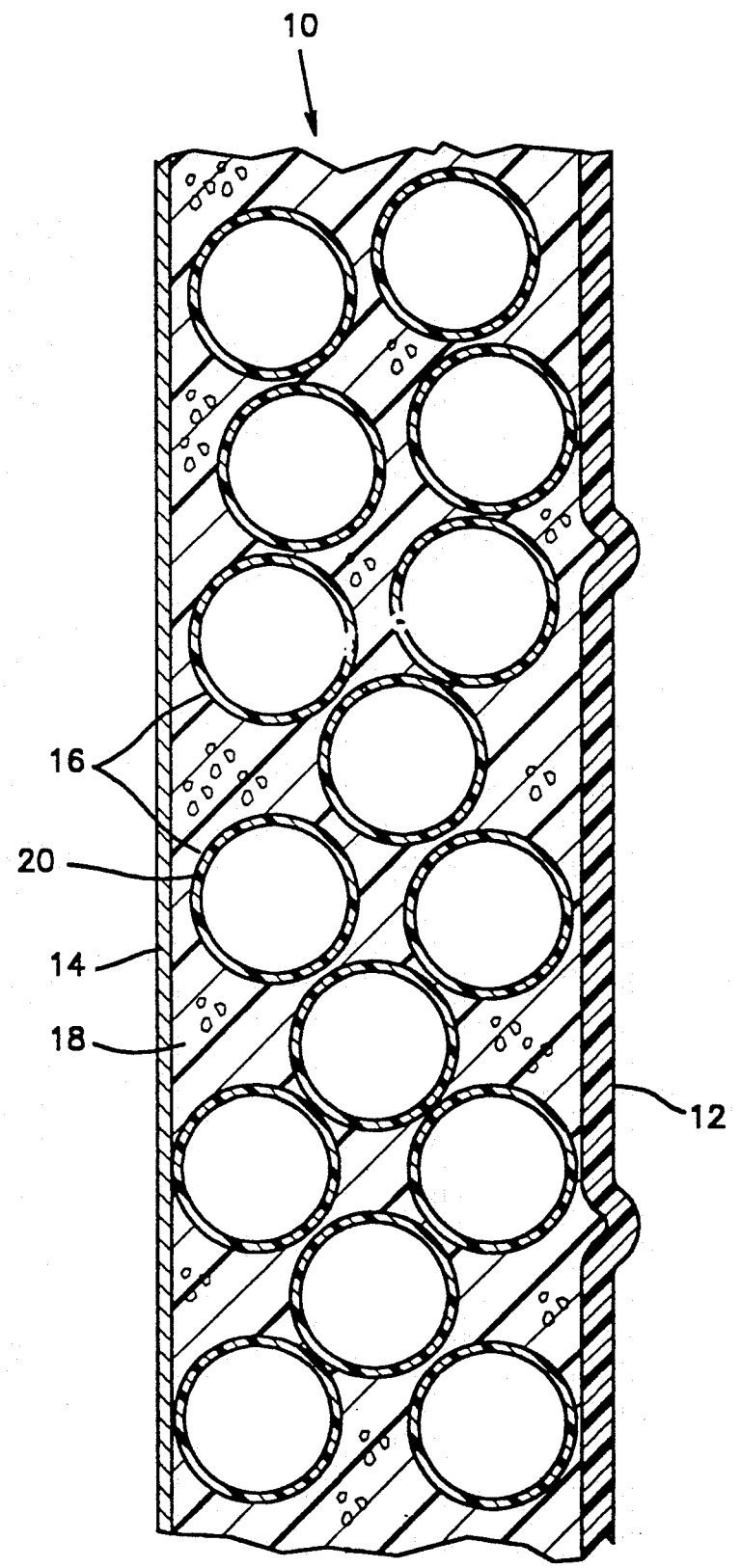
FIG. 1 is a cross sectional view of a refrigerator wall having an insulation cavity filled with molded plastic spheres and foam in accordance with the invention.

In FIG. 1 there is illustrated the composite insulation of the invention distributed within an insulation cavity 10 of a refrigerator or freezer. The cavity 10 is defined by an inner ABS plastic liner 12 and an outer steel shell 14. Molded thermoplastic spheres 16 are positioned within the insulation cavity 10 in a closely packed configuration with polyurethane or other foam insulation filling in the interstitial spaces between the spheres 11.

According to one aspect of this invention each individual sphere 16 is manufactured in a vacuum to produce a rigid seamless, hollow sphere defining an evacuated space. A suitable quantity of thermoplastic material is used in the manufacturing process to provide a wall 20 having a thickness sufficient to resist deformation forces caused by the pressure differential across the wall.

The spheres 16 and foam insulation are mixed together and then conventional foam spraying methods are used to introduce the composite into the insulation cavity as a foamed-in-place installation.

Figure 2:
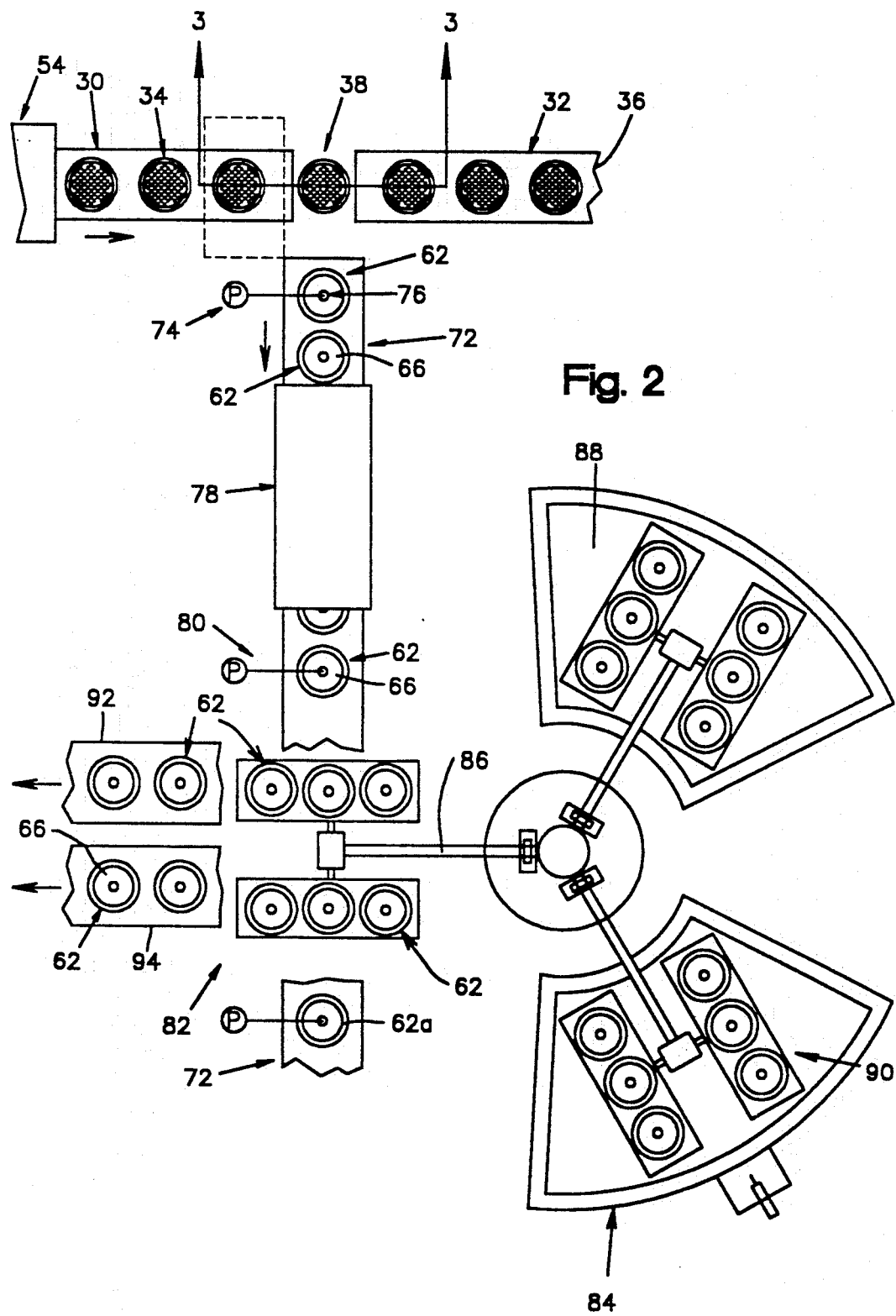
FIG. 2 is a semi-schematic plan view of a rotational casting machine adapted to produce spheres according to this invention.
Figure 3:
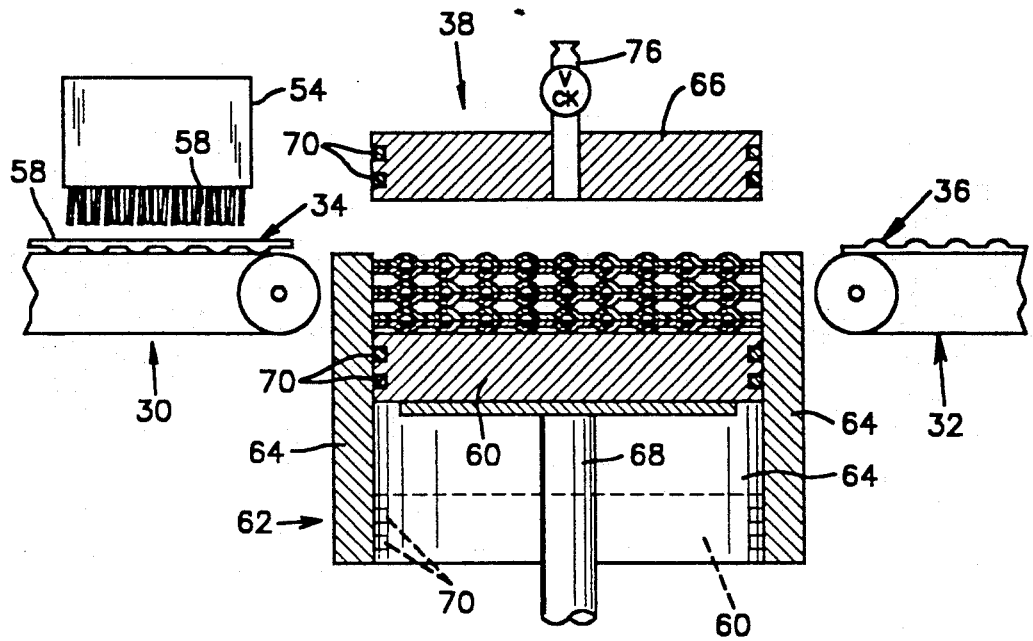
FIG. 3 is an enlarged cross-sectional view the plane of the section being indicated by the line 3—3 in FIG. 2.

The spheres 16 are preferably manufactured by a rotational casting technique employing the apparatus illustrated in FIGS. 2-5. Referring now to FIG. 2, there is illustrated a mold assembly and rotational casting arrangement for producing the spheres 16. The mold assembly arrangement includes a pair of feed conveyors 30 and 32 which respectively convey lower and upper rotational casting mold halves 34 and 36, respectively, to a mold stacking station 38.

Figure 4:
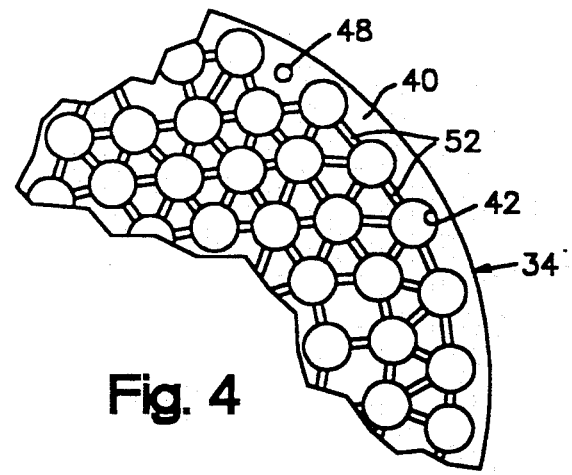
FIG. 4 is an enlarged fragmentary plan view of a mold half.
Figure 5:
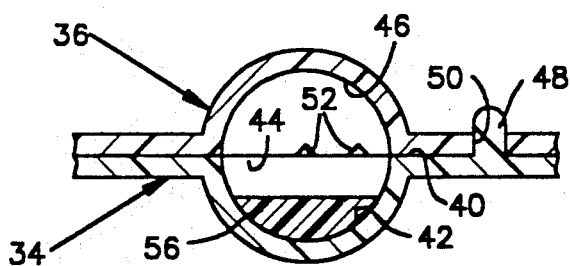
FIG. 5 is a cross-sectional view of a portion of an assembled mold illustrating a single molding chamber.
Figure 9:
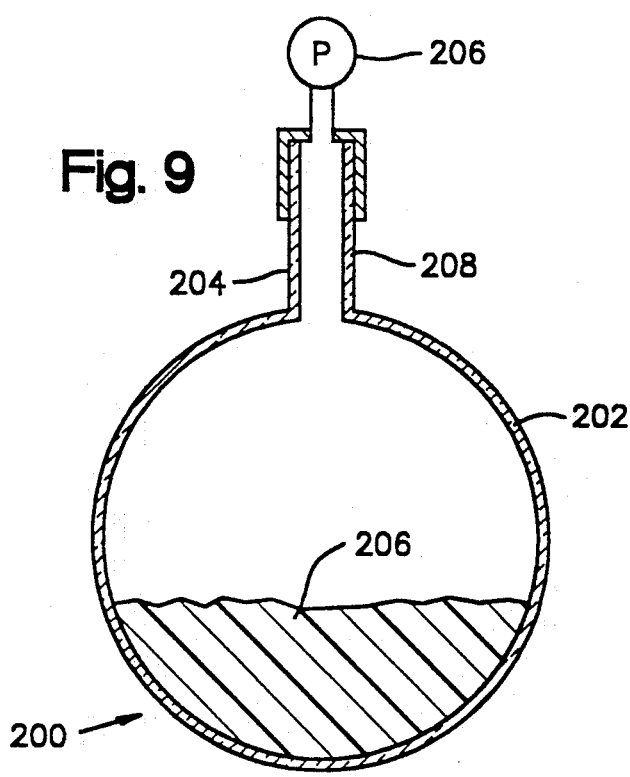
FIG. 9 is cross-sectional view of a blown glass bead according to a further aspect of this invention, illustrating the bead in an early stage of its manufacture.

The lower and upper mold halves 34 and 36 are substantially identical and, as may be seen more clearly in FIGS. 4 and 5, are shaped like an egg crate. Each lower mold half 34 comprises an upper mating surface 40 having a multiplicity of hemispherical cavities 42 formed therein. Similarly, each upper mold half 36 has a mating surface 44 with a multiplicity of hemispherical mold cavities 46 formed therein. The mold halves 34 and 36 are desirably formed from aluminum with a wall thickness which is sufficient to withstand assembly pressures, but which is sufficiently thin to ensure rapid heat transfer as is known to those skilled in the art of rotational casting. The mold halves 34 and 36 are respectively provided with draft pins 48 and cooperating apertures 50 to maintain proper registry of the mold halves upon assembly. For purposes which will hereinafter become apparent, a network of interconnecting grooves 52 establish communication between each mold cavity and the exterior of each mold. Alternately, one or more of the mold faces 40 and 44 may be abraded to inhibit close registry between the mating mold halves.

The mold halves 34 are placed on the conveyor 30 so the conveyor 30 is incrementally advanced toward the assembly station 38. While a bottom mold half 34 is dwelling on the conveyor 30 and is positioned below a resin feed hopper 54, metered amounts of a powdered or liquid molding resin 56 is fed into each mold cavity 42 by feed tubes 58. After each mold half 34 is charged with resin, it is conveyed to the assembly station 38 where it is placed on a moveable cylindrical bottom plate 60 of a cylindrical mold carrier container 62. In addition to the bottom plate 60, the carrier 62 includes a cylindrical sidewall 64 and a top cover plate 66. The bottom plate 60 is supported on an incrementally moveable piston 68.

With the upper surface of the plate 60 advanced adjacent the top edge of the sidewall 64, a filled bottom mold half 34 is placed thereon and is covered by an upper mold half 36. The piston 68 is incrementally retracted an amount substantially corresponding to the thickness of an assembled mold, and the process is repeated until the piston 68 and the bottom plate 60 are in their phantom outline positions illustrated in FIG. 3. The cover plate 66 is then placed on the stacked molds so that the top and bottom ends of the mold casing 62 are sealed by O-rings 70 on the upper and lower plates 66 and 60.

Referring again to FIG. 2, the assembled mold carrier 62 is transported by a conveyor 72 to a vacuum pumping station 74 where a vacuum hose is connected to a fitting 76 provided on the upper plate 66. A vacuum of about 0.07 torr is applied to the interior of the carrier 62 so that the upper and lower plates 66 and 60 firmly engage the stacked mold halves. As may be appreciated, the pressure within the casing 62 should be as low as possible. Higher pressures are acceptable, but with a proportional sacrifice in insulating efficiency. It should be noted that the mold thickness should be sufficient to withstand the external pressures applied without crushing. The mold carriers 62 are then conveyed by the conveyor 72 through a heating tunnel 78 which raises the molding compound to a temperature which is sufficient to drive off gases from the composition. As each mold carrier 62 exits the heating tunnel 78 and arrives at a second vacuum pumping station 80 where a vacuum of 0.07 torr is applied to the interior of the mold carrier 62 to remove any volatile gases which may have been generated during the heating step.

As may be seen partially in FIG. 2, the foregoing mold assembly line is duplicated so that assembled and evacuated mold casings 62 and 62a are delivered to a loading and unloading station 82 of a conventional rotational casting machine 84. A plurality of carriers 62 are mounted on opposite sides of an arm 86 of the machine 84 from each conveyor 72. Each arm 86 is then indexed 120° to a heating oven 88 where the molds are rotated about two mutually perpendicular axes while heat is applied to the molds so that the polymer powder or paste within the mold melts or gels on the inner surface. The still rotating arm 86 is then indexed through 120° to a cooling chamber 90 where a water spray is sprayed on the molds until the plastic solidifies. The arm 86 is then indexed through 120° to the loading and unloading station 82 where the mold carriers 62 are removed from the arm 86 and placed on conveyors 92 and 94 for disassembly.

According to a further aspect of this invention, the spheres 16 may be manufactured by a modified rotational casting technique which is illustrated in FIGS. 6-8. Referring now to those figures, FIG. 8 illustrates a spherical mold 100 which may be fabricated from steel and which has cooperating mold halves 102 and 104. The mold half 102 has a hemispherical mold cavity 106 and a threaded recess 108. The other mold half 104 has a cooperating threaded projection 110 and a hemispherical mold cavity 112 which cooperates with the mold cavity 106 to form a spherical molding chamber 114. The threads between the mold halves 102 and 104 are loose fitting to permit air to be evacuated from the mold cavity 114. Each mold half 102 and 104 is provided with a square recess 116 to permit insertion of tools for opening the mold cavity.

The mold cavity 114 is partially filled with a powder or paste polymer 118, and the spherical molds are introduced into a vacuum molding chamber 120. The chamber 120 comprises air tight walls 122 which define an enclosure 124 which is evacuated by a vacuum pump 126.

The assembled molds 100 are introduced to the enclosure 124 through interlocked ball valves 128 so that a vacuum is maintained within the enclosure 124. The molds 100 are received by a feed tray 130 which is sloped slightly toward a gate assembly 132 which is operable to release individual molds 100 from the feed tray 130 onto a molding ramp 134 at a predetermined rate.

The molding ramp 134 is arcuate in shape to conform to the curvature above the molds 100 and has a series of intersecting ramp legs 136, 138, 140 and 142, which change the direction of rotation of the molds 100 at their intersections by 90°, 45° and 90°, respectively, to evenly coat the mold cavity 114 with resin. The ramp 134 is constructed from a non-metallic material, such as a ceramic, and is surrounded by an induction heating coil 144 which heats the molds 100 as the molds traverse the ramp 134. The ramp 134 is sloped downwardly at an angle which is sufficient to permit the molds 100 to slowly traverse the entire extent of the ramp 134 so that the molding material becomes fluid and coats the entire surface of the mold cavity 114. When a mold 100 reaches the end of the leg 142, it enters a tubular cooling ramp 150 which comprises a tubular housing surrounded by a refrigeration coil 152. The ramp 150 comprises a plurality of intersecting legs 154, 156, 158, 160, 162, 164, 166 and 168.

While the molds 100 traverse the legs 152-168, they are cooled so that the hollow evacuated sphere formed in the mold cavity 106 is self-supporting, and the molds 100 are deposited into a receiving tray 170.

The molds 100 are then received in interlocked ball valves 172 and are sequentially released from the chamber where they may be subject to a further cooling operation and disassembly of each mold 100.

Figure 10:
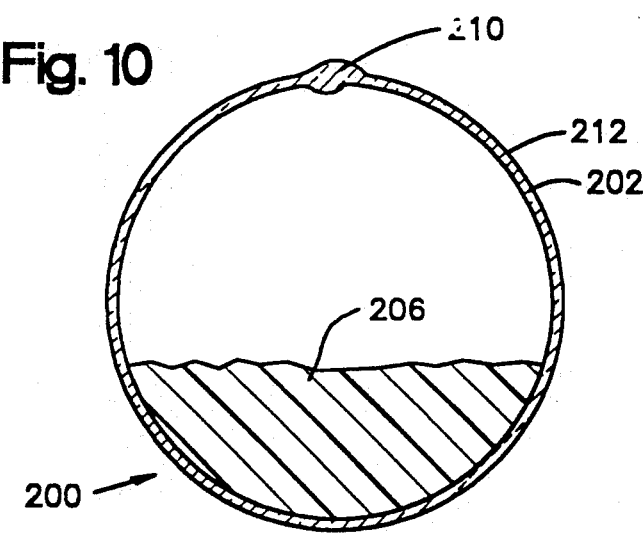
FIG. 10 is a cross-sectional view of the blown glass bead shown in FIG. 9 at a later stage of its manufacture.
Figure 11:
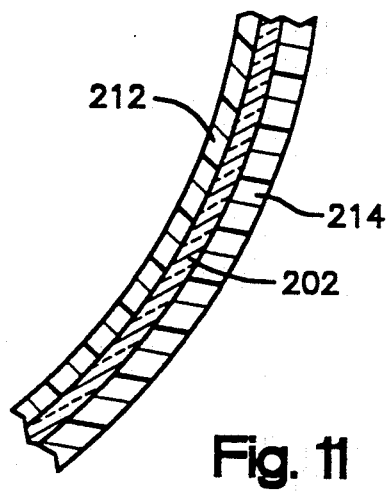
FIG. 11 is a cross-sectional view of a blown glass bead having an inner thermoplastic liner and an outer thermoplastic layer.

Referring now to FIGS. 10 and 11, there is illustrated a rigid hollow sphere 200 according to a still further aspect of this invention. The sphere 200 may be manufactured by a glass blowing technique to form a thin spherical body 202 having a cylindrical neck 204 protruding therefrom. A powder or paste thermoplastic molding compound 206 is injected into the body 202, and the neck portion 204 is evacuated by a vacuum pump 206. During evacuation, the body 202 may be heated to drive off any volatile gases generated by the resin. When the desired vacuum is attained within the body 202, a portion 208 of the neck 204 is locally heated, and the neck is pinched off to form a sealed portion 210 to retain the vacuum within the body 202. The body 202 may then be dipped in a suitable thermoplastic to form an outer layer 214, and the thus formed article may then be placed in a containerized mold, such as a mold formed by the mold halves 34 and 36, and the thermoplastic 206 may be rotationally cast onto the inner wall of the body 202 to form an inner thermoplastic liner 212.

These descriptions of specific embodiments of the invention are merely illustrative of the underlying inventive concept. Various modifications of the disclosed embodiments, which do not depart from the spirit and scope of the invention, will be apparent to those skilled in the art.

I claim:

1. A method of making an insulating wall comprising the steps of blowing a glass sphere having an inside surface, an outside surface and a tubular neck portion, introducing a metered amount of a thermoplastic resin into said sphere, evacuating gas from the glass sphere through said neck portion to create at least a partial vacuum in said sphere, heating and fusing said neck portion adjacent said sphere to seal said sphere while the said sphere is subjected to said vacuum, heating said sphere and rotating said sphere about two mutually perpendicular axes to coat the inside surface of said sphere with said thermoplastic resin, cooling said sphere while continuing to rotate said sphere, incorporating said sphere in a plastic resin which is capable of being foamed in place, introducing said resin and said sphere into a space defined by a pair of spaced apart panels, and causing said resin to foam in place.

2. A method according to claim 1 including the step of coating the outside surface of said sphere with a thermoplastic resin.

* * * * *